US011510050B2

(12) United States Patent
Kim et al.

(10) Patent No.: US 11,510,050 B2
(45) Date of Patent: Nov. 22, 2022

(54) DETERMINING TECHNOLOGICAL CAPABILITY OF DEVICES HAVING UNKNOWN TECHNOLOGICAL CAPABILITY AND WHICH ARE ASSOCIATED WITH A TELECOMMUNICATION NETWORK

(71) Applicant: T-Mobile USA, Inc., Bellevue, WA (US)

(72) Inventors: Huijae Kim, Sammamish, WA (US); Ajay Meenkumar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 52 days.

(21) Appl. No.: 17/228,505

(22) Filed: Apr. 12, 2021

(65) Prior Publication Data

US 2021/0368330 A1 Nov. 25, 2021

Related U.S. Application Data

(63) Continuation of application No. 16/878,415, filed on May 19, 2020, now Pat. No. 11,006,268.

(51) Int. Cl.
*H04W 8/22* (2009.01)
*G06N 20/00* (2019.01)
*H04W 24/10* (2009.01)

(52) U.S. Cl.
CPC .............. *H04W 8/22* (2013.01); *G06N 20/00* (2019.01); *H04W 24/10* (2013.01)

(58) Field of Classification Search
CPC ......... H04W 4/02; H04W 4/50; H04W 88/06; H04W 8/18; H04W 24/02; H04W 72/02;
(Continued)

(56) References Cited

U.S. PATENT DOCUMENTS 5,918,207 A 6/1999 McGovern et al.
8,135,661 B2 3/2012 Olsson
(Continued)

OTHER PUBLICATIONS

International Searching Authority, International Search Report and Written Opinion, PCT Patent Application PCT/US2021/022236, dated Jun. 25, 2021, 12 pages.

*Primary Examiner* — Kwasi Karikari
(74) *Attorney, Agent, or Firm* — Perkins Coie LLP (57) ABSTRACT

This disclosure describes techniques for determining technological capability of devices whose technological capability are unknown. The devices can be users of a wireless telecommunication network. A device, such as a cell phone, has a type allocation code (TAC) which can indicate a make and model of the device. Once the make and model of the device are known, the technical capability of the device is known. Certain TAC numbers, however, do not indicate the make and model of the device, and thus a device's technical capability is unknown. To determine the technological capability of the devices, a machine learning model is trained using usage data of the devices with known technological capability. After training, the machine learning model can be deployed to predict the technological capability of devices with unrecognizable TAC numbers by providing usage data associated with the devices with unrecognizable TAC numbers.

19 Claims, 5 Drawing Sheets

(58) Field of Classification Search
CPC ... H04W 88/02; H04W 40/246; H04W 48/18; H04W 4/16
See application file for complete search history.

(56) References Cited

U.S. PATENT DOCUMENTS

| | | |
|---|---|---|
| 8,254,393 B2 | 8/2012 | Horvitz |
| 8,560,420 B2 | 10/2013 | Mendelsohn |
| 8,903,983 B2 | 12/2014 | Bakman et al. |
| 9,219,592 B1 | 12/2015 | Nichols et al. |
| 9,367,803 B2 | 6/2016 | Yadav et al. |
| 9,572,165 B2 | 2/2017 | Keerthi |
| 9,961,560 B2 | 5/2018 | Farkas et al. |
| 10,031,785 B2 | 7/2018 | Gonzalez et al. |
| 10,129,126 B2 | 11/2018 | Dintenfass et al. |
| 10,489,711 B1 | 11/2019 | Inbar et al. |
| 2007/0255672 A1 | 11/2007 | Olsson |
| 2009/0003201 A1 | 1/2009 | Horvitz |
| 2009/0024546 A1 | 1/2009 | Ficcaglia et al. |
| 2011/0137821 A1 | 6/2011 | Mendelsohn |
| 2013/0178208 A1 | 7/2013 | Dahlen et al. |
| 2014/0307549 A1 | 10/2014 | Kotecha et al. |
| 2015/0085756 A1 | 3/2015 | Sheth et al. |
| 2015/0277980 A1 | 10/2015 | Ovsiankin et al. |
| 2016/0301624 A1 | 10/2016 | Gonzalez et al. |
| 2016/0379244 A1 | 12/2016 | Kalish et al. |
| 2017/0257821 A1* | 9/2017 | Smith ................ H04L 41/0853 |
| 2017/0372216 A1 | 12/2017 | Awiszus et al. |
| 2018/0213421 A1 | 7/2018 | Horvitz et al. |
| 2018/0268301 A1 | 9/2018 | Bouz et al. |
| 2018/0372724 A1 | 12/2018 | Khine et al. |
| 2019/0114550 A1 | 4/2019 | Hölzl et al. |
| 2019/0213605 A1 | 7/2019 | Patel et al. |
| 2019/0239064 A1 | 8/2019 | Stojanovski et al. |
| 2019/0278261 A1 | 9/2019 | Shibuya |
| 2019/0347113 A1 | 11/2019 | Ma et al. |
| 2019/0347148 A1 | 11/2019 | Gomes Pereira et al. |
| 2020/0019841 A1 | 1/2020 | Shaabana et al. |
| 2021/0099431 A1* | 4/2021 | Wasicek ............. G06F 21/6263 |

* cited by examiner

DETERMINING TECHNOLOGICAL CAPABILITY OF DEVICES HAVING UNKNOWN TECHNOLOGICAL CAPABILITY AND WHICH ARE ASSOCIATED WITH A TELECOMMUNICATION NETWORK

CROSS-REFERENCES TO RELATED APPLICATIONS

This application is a continuation of U.S. patent application Ser. No. 16/878,415 filed May 19, 2020, entitled DETERMINING TECHNOLOGICAL CAPABILITY OF DEVICES HAVING UNKNOWN TECHNOLOGICAL CAPABILITY AND WHICH ARE ASSOCIATED WITH A TELECOMMUNICATION NETWORK, the entirety of which is hereby incorporated by reference.

BACKGROUND

Some devices using a telecommunication network, such as a cellular network, have a known technological capability because their make and model is known. However, some of the devices using the telecommunication network do not have a known technological capability because their make and model cannot be identified. The devices having unknown technological capability present a challenge to the management of the telecommunication network because predicting effects of telecommunication network upgrades on the devices having unknown technological capability is difficult. Similarly, determining what telecommunication network infrastructure is needed without knowing the demands placed on the telecommunication network by the devices having unknown technological capability is challenging.

DETAILED DESCRIPTION

This disclosure describes techniques for determining technological capability of devices whose technological capability is unknown. The devices can be users of a wireless telecommunication network. A device, such as a cell phone, has a type allocation code (TAC) which can indicate a make and model of the device. For example, a TAC number of 01161200 indicates that the make is Apple and that the model is iPhone 3G, while a TAC number of 32930400 indicates that the make is Samsung and that the model is Galaxy S7. Once the make and model of the device are known, the technical capabilities of the device are known. The technological capability can be split into three categories: 1) technology support such as 2G, 3G, Long-Term Evolution (LTE), 5G; 2) support for voice over LTE; or 3) LTE band support, such as support on LTE band 2, 4, or 12. Certain TAC numbers, however, do not indicate the make and model of the device, and thus a device's technical capability is unknown.

To determine the technological capability of the devices, a machine learning model is trained using usage data of the devices with known technological capability. The usage data can include a percent of data consumption on 2G, 3G, LTE, 5G networks, percent of voice over LTE usage, percent of usage of LTE bands 2, 4 (also known as mid bands), and percent of usage of LTE band 12, also known as low band. The machine learning model makes a prediction regarding the technological capability of a device, and the prediction is compared to the known technological capability of the device, in order to provide positive or negative feedback to the machine learning model.

After training, the machine learning model can be deployed to predict the technological capability of devices with unrecognizable TAC numbers, that is, devices having unknown technological capability, by obtaining usage data associated with those devices with unrecognizable TAC numbers. Based on the technological capability of the devices with unrecognizable TAC numbers and the devices with recognizable TAC numbers, the usage of the telecommunication network, effects of network upgrades and needed coverage areas can be predicted.

Figure 1:
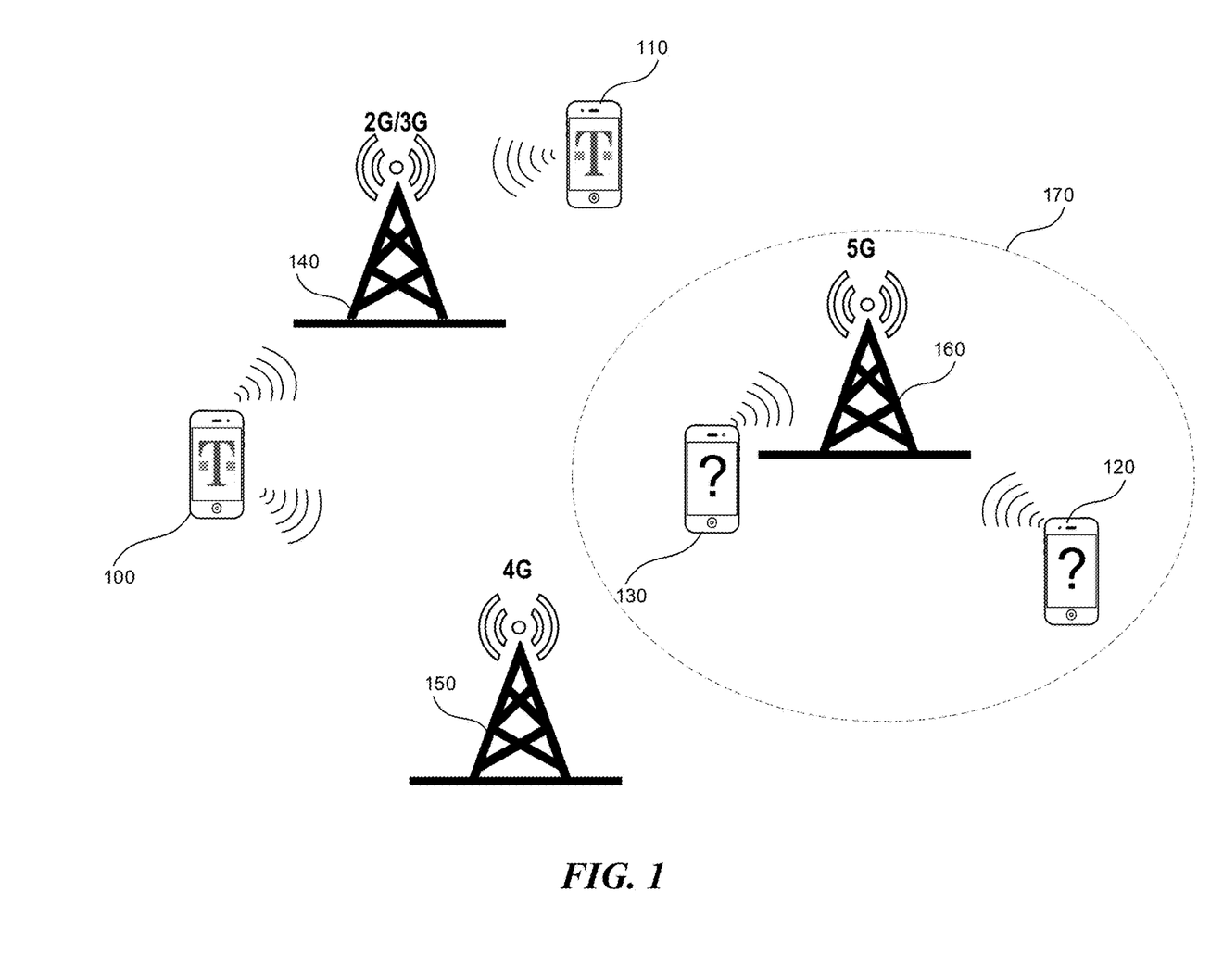
FIG. 1 shows multiple devices in communication with a wireless telecommunication network.

FIG. 1 shows multiple devices in communication with a wireless telecommunication network. The multiple devices can include devices with known technological capability 100, 110, and devices with unknown technological capability 120, 130. The multiple devices 100, 110, 120, 130 can be in communication with the wireless telecommunication network containing access points 140, 150, 160. The access points 140, 150, 160 can be cell towers offering 2G, 3G, 4G, 5G service, or the access points can be Wi-Fi access points.

The multiple devices with known technological capability 100, 110 have a TAC number which indicates the make and model of the device. Each device can have one or more TAC numbers, which indicate the technical capability of the device. As noted above, certain TAC numbers do not indicate the make and model of the device, and thus its technical capability is unknown—for example devices 120, 130.

Having devices with unknown technological capability 120, 130 can make planning for telecommunication network infrastructure difficult. For example, when planning for a telecommunication network upgrade, predicting how the devices 120, 130 will be impacted is difficult, if not impossible, if the capability of the devices 120, 130 is not known. Further, knowing the technological capability of the devices 120, 130 can enable the telecommunication network to provide better service to the devices. For example, knowing that the devices 120, 130 use 5G, and that they tend to be located in an area 170, can enable the determination that 5G towers or 5G sectors should be added in the area 170.

The technological capability of devices 100, 110, 120, 130 can be split into categories, such as: 1) support for air interface protocols; 2) support for voice over LTE; or 3) LTE band support. To determine the technological capability of devices 120, 130, a machine learning model 200 shown in FIG. 2 can include two sub-models 210, 220 for performing each of two steps.

Figure 2:
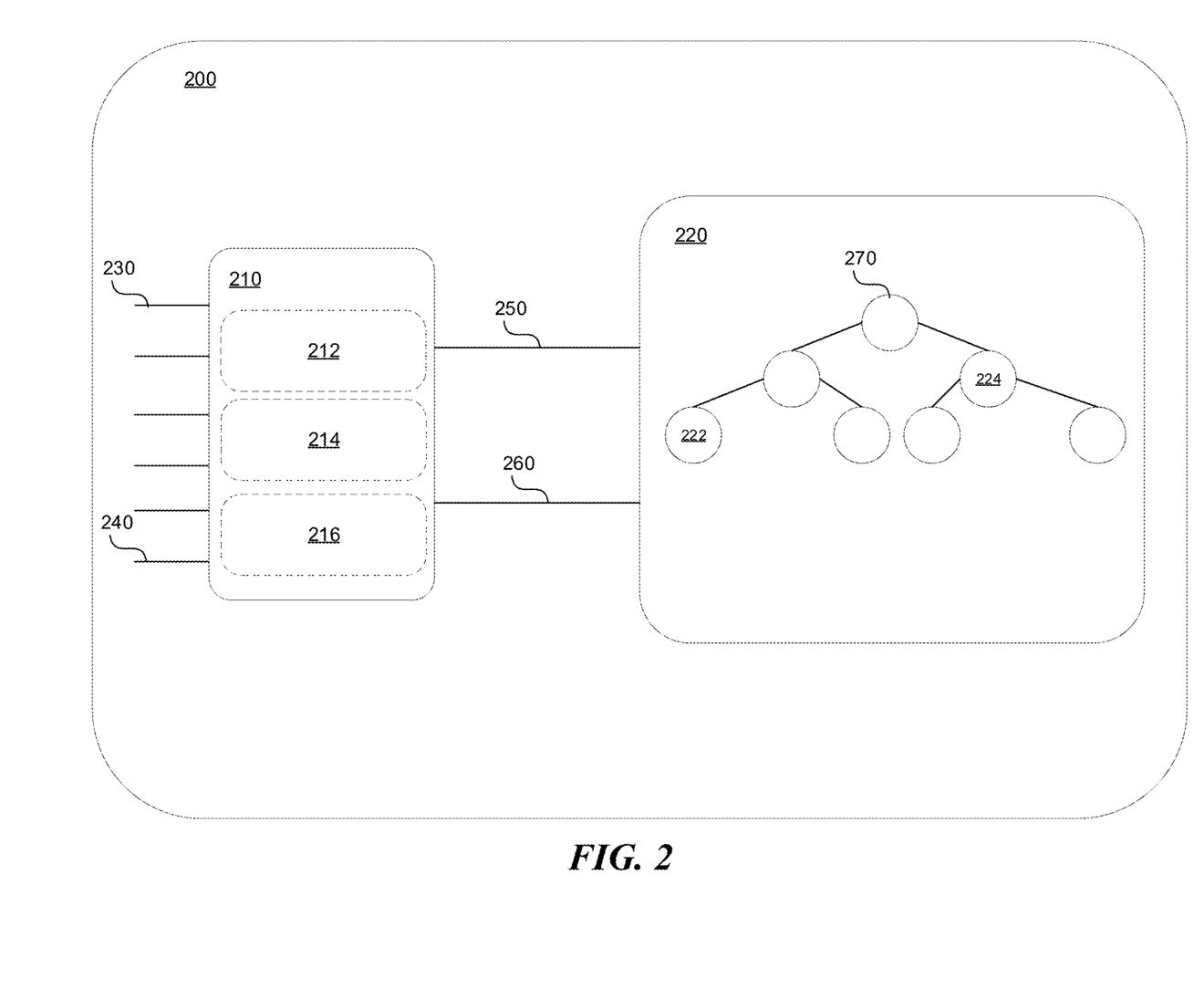
FIG. 2 shows a machine learning model.

The sub-model 210 can receive inputs 230, 240, etc. (only two labeled for brevity), and produce one or more outputs 250, 260. The inputs 230, 240 can include usage information associated with use of the telecommunication network, where the usage information depends on the technological capability of the device 120, 130 in FIG. 1 that the machine learning model 200 is trying to determine. The machine learning model 200 can run on a hardware or a software processor.

For example, if the processor is trying to determine what air interface protocol the device 120, 130 supports, the processor can determine the TAC number of the device 120, 130 and can obtain usage information of all devices having the same TAC number as the TAC number of the device 120, 130. The usage information can include:

- a percent of data consumption associated with 2G air interface protocol of all the devices having the same TAC number,
- percent of data consumption associated with 3G air interface protocol of all the devices having the same TAC number,
- percent of data consumption associated with LTE air interface protocol of all the devices having the same TAC number,
- percent of data consumption associated with 5G air interface protocol of all the devices having the same TAC number,
- percent of devices using 2G air interface protocol of all the devices having the same TAC number,
- percent of devices using 3G air interface protocol of all the devices having the same TAC number,
- percent of devices using LTE air interface protocol of all the devices having the same TAC number, and/or
- percent of devices using 5G air interface protocol of all the devices having the same TAC number.

The processor can pass the usage information to the machine learning model 200 using the inputs 230, 240.

In another example, if the processor is trying to determine whether the device 120, 130 supports voice over LTE, the processor can determine the TAC number of the device 120, 130 and can obtain usage information of all devices having the same TAC number as the TAC number of the device 120, 130. The usage information can include percent of calls using voice over LTE of all the devices having the same TAC number, and/or percent of devices using voice over LTE of all the devices having the same TAC number. The processor can pass the usage information to the machine learning model 200 using the inputs 230, 240.

In a third example, if the processor is trying to determine whether the device 120, 130 supports using LTE band 2, 4, or 12, the processor can determine the TAC number of the device 120, 130 and can obtain usage information of all devices having the same TAC number as the TAC number of the device 120, 130. Bands 2 and 4 are considered mid-bands and offer higher bandwidth but provide lower coverage. Band 12 is considered low-band, and offers lower bandwidth, but the coverage is higher, due to the low frequencies in band 12 propagating farther and having lower absorption issues with the environment, than do bands 2 and 4. The usage information can include:

- a percent of devices using mid-band LTE of all the devices having the same TAC number,
- percent of devices using high-band LTE of all the devices having the same TAC number,
- percent of data consumption associated with LTE band 2 of all the devices having the same TAC number,
- percent of data consumption associated with LTE band 4 of all the devices having the same TAC number,
- percent of data consumption associated with LTE band 12 of all the devices having the same TAC number,
- percent of devices using LTE band 4 of all the devices having the same TAC number,
- percent of devices using LTE band 2 of all the devices having the same TAC number, and/or
- percent of devices using LTE band 12 of all the devices having the same TAC number.

Based on the inputs 230, 240, the machine learning sub-model 210 can produce the output 250, 260, which selects a subset of inputs 230, 240, also known as key performance indicators (KPIs), that is most indicative of the technological capability of the device. For example, out of nine inputs, the machine learning model can select two inputs to create the outputs 250, 260. In a more specific example, to determine if the device 120, 130 is capable of 5G air interface, the machine learning sub-model 210 can select an input indicating the percent of data consumption associated with 5G air interface protocol of all the devices having the same TAC number, and/or an input indicating percent of devices using 5G air interface protocol of all the devices having the same TAC number.

In one embodiment, one machine learning sub-model 210 can receive inputs for all categories of the technological capability, and can produce outputs 250, 260. In another embodiment, the machine learning sub-model 210 can be further divided into sub-sub-models 212, 214, 216 where each sub-sub-model corresponds to a category of technological capability and can receive inputs and produce outputs for a specific category of technological capability. In a more specific example, if there are three technological capability categories such as 1) support for air interface protocols such as 2G, 3G, LTE, 5G; 2) support for voice over LTE; or 3) LTE band support, such as LTE band 2, 4, 12, there can be three sub-sub-models 212, 214, 216, where each sub-sub-model corresponds to one of the three technological capability categories.

Once the machine learning sub-model 210 determines the KPIs 250, 260 indicative of the technological capability of devices 120, 130, the KPIs 250, 260 are processed by the machine learning sub-model 220. The machine learning sub-model 220 can be a decision tree 270, where each node 222, 224 (only two labeled for brevity) in the decision tree includes a threshold used to determine a technological capability of a device. A leaf node 222 in the decision tree can specify the technological capability of the device. There can be a single decision tree for each KPI 250, 260.

For example, to determine whether the device 120, 130 has support for voice over LTE, the usage information can include the last 30 days of telecommunication network usage by the device 120, 130. The usage information can include a percent of calls using voice over LTE of device 120, 130, and/or percent of devices using voice over LTE of all the devices having the same TAC number. The machine learning sub-model 210 can produce two KPIs 250, 260, which, for example, can include a percent of calls using voice over LTE of device 120. The machine learning sub-model 220 can compare the KPIs 250, 262 to the threshold contained in node 222, 224.

For example, the processor using the node 222, 224 can test and determine that if 20% or more of all calls by the device 120, 130 were performed using voice over LTE, then the device 120, 130 supports voice over LTE. In another example, the processor using the node 222, 224 can test and determine that if 80% or more of all devices having the same TAC number as device 120, 130 support voice over LTE, then the device 120, 130 also supports voice over LTE.

The machine learning sub-model 220 can adjust the thresholds in nodes 222, 224 based on positive or negative feedback. Using the thresholds in the nodes 222, 224, the processor can test whether 85% of the devices having the same TAC number use LTE bands 2, 4, and determine that the device having the TAC number supports LTE bands 2, 4. Using the thresholds in the nodes 222, 224, the processor can test whether 65% of the data usage of the device 120, 130 consists of LTE band 12 usage, and can determine that the device 120, 130 supports LTE band 12 usage. Using the thresholds in the nodes 222, 224, the processor can test whether 85% of the data usage of the device 120, 130 consists of LTE usage, and can determine that the device 120, 130 supports LTE usage. Using the thresholds in the nodes 222, 224, the processor can also test whether 20% of the data usage of the device 120, 130 consists of 2G usage and can determine that the device 120, 130 is capable of 2G air interface. Using the thresholds in the nodes 222, 224, the processor can test whether 30% of the data usage of the device 120, 130 consists of 3G usage, and can determine that the device 120, 130 is capable of 3G air interface.

The machine learning model 200 can be trained using devices 100, 110 having known technological capability. During training, the thresholds in the nodes 222, 224 can be refined to reach a better prediction. When the machine learning model 200 makes a determination regarding a device having known technological capability, and the prediction is correct, the machine learning model 200 can be positively reinforced. When the machine learning model 200 makes an incorrect prediction, the machine learning model 200 can be negatively reinforced.

Once the machine learning model 200 is trained, the machine learning model can be deployed on devices having unknown technological capability 120, 130. There should be no overlap between the devices having known technological capability 100, 110 and the devices having unknown technological capability 120, 130.

Figure 3:
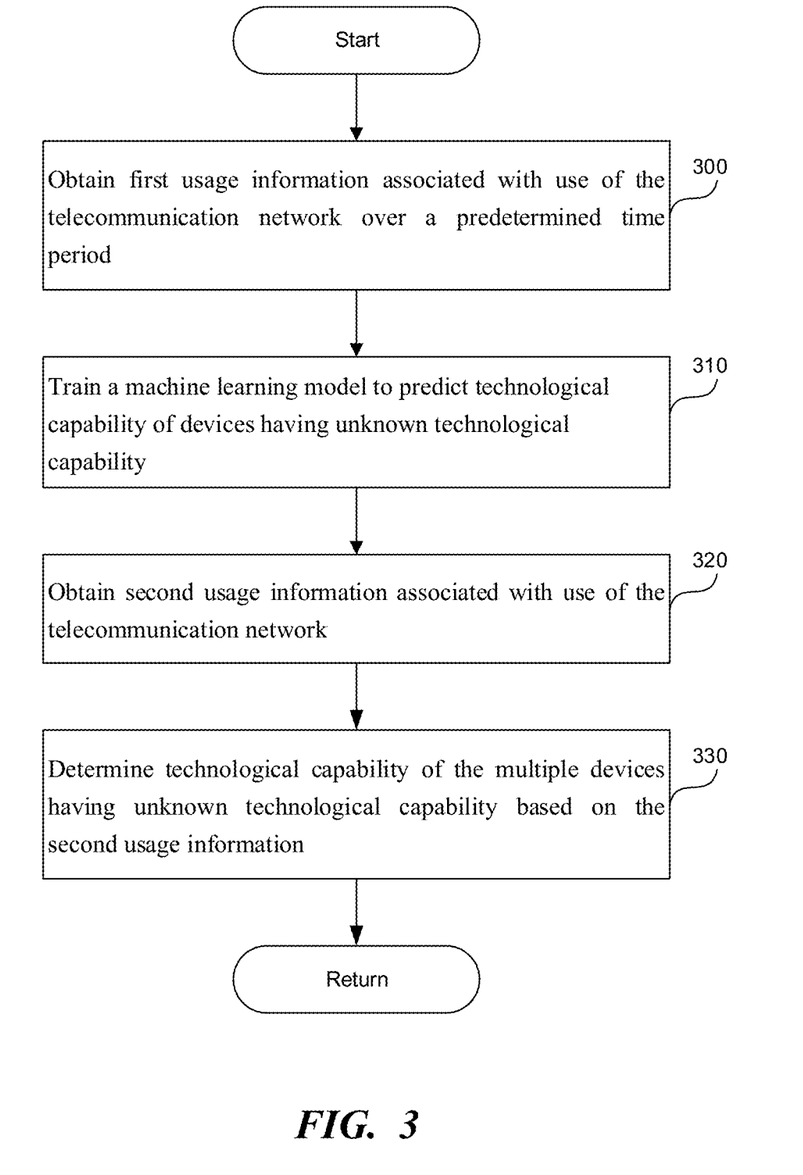
FIG. 3 is a flowchart of a method to determine technological capability of multiple devices having unknown technological capability and which are associated with a telecommunication network, according to one embodiment.

FIG. 3 is a flowchart of a method to determine technological capability of multiple devices having unknown technological capability and which are associated with a telecommunication network, according to one embodiment.

In step 300, a hardware or software processor can execute instructions that cause the processor to obtain first usage information associated with use of the telecommunication network over a predetermined time period. The predetermined time period can include the last week, last month, last several months, etc. The first usage information represents usage of the telecommunication network by a first set of multiple devices having known technological capability including which air interface protocols are supported by devices in the first set of devices, whether voice over LTE is supported by certain devices in the first set of devices, and which LTE bands, such as 2, 4 and/or 12, are supported by certain devices in the first set of devices.

In step 310, the processor can train a machine learning model to predict technological capability of devices having unknown technological capability using the first usage information and the known technological capability. For example, if the machine learning model incorrectly predicts the technological capability of a device having known technological capability, the machine learning model can receive negative feedback, thereby increasing accuracy of the machine learning model. In another example, if the machine learning model correctly predicts the technological capability of the device having known technological capability, the machine learning model can receive positive feedback.

To train the machine learning model, the processor can receive first usage information including multiple parameters. The processor can determine a subset of the multiple parameters to obtain KPI parameters. The processor can create a decision tree based on the KPI parameters, where a node in the decision tree includes a threshold used to determine a technological capability of a device, and where a leaf node in the decision tree indicates the technological capability of the device.

The machine learning model can include a first sub-model and a second sub-model. The second sub-model can be a decision tree, where a node in the decision tree includes a threshold used to determine a technological capability of a device. To determine the technological capability of the multiple devices having unknown technological capability, the processor can obtain usage information from a device having unknown technological capability among the multiple devices having unknown technological capability. The processor can determine, using the first sub-model, a subset of the usage information to obtain a KPI parameter. The processor can traverse the decision tree by comparing the KPI parameter to the threshold contained in a node of the decision tree. For example, if the comparison is true, the processor can traverse the decision tree to the right, while if the comparison is false, the processor can traverse the decision tree to the left. Upon reaching a leaf node of the decision tree, the processor can obtain a technological capability associated with the device having unknown technological capability.

In step 320, the processor can obtain second usage information associated with use of the telecommunication network. The second usage information represents usage of the telecommunication network by a second set of multiple devices having unknown technological capability. The first and second usage information can include any combination of the following:

percent of data consumption associated with 2G air interface protocol, percent of data consumption associated with 3G air interface protocol, percent of data consumption associated with LTE air interface protocol, percent of data consumption associated with 5G air interface protocol, percent of devices using 2G air interface protocol and having the same TAC number, percent of devices using 3G air interface protocol and having the same TAC number, percent of devices using LTE air interface protocol and having the same TAC number, percent of devices using 5G air interface protocol and having the same TAC number, percent of calls using voice over LTE, percent of devices using voice over LTE and having the same TAC number, percent of devices using mid-band LTE and having the same TAC number, percent of devices using high-band LTE and having the same TAC number, percent of data consumption associated with LTE band 2, percent of data consumption associated with LTE band 4, percent of data consumption associated with LTE band 12, percent of devices using LTE band 4 and having the same TAC number, percent of devices using LTE band 2 and having the same TAC number, and/or percent of devices using LTE band 12 and having the same TAC number.

In step 330, the processor can determine, using the trained machine learning model, technological capability of the multiple devices having unknown technological capability based on the second usage information.

To determine whether the device has known or unknown technological capability, the processor can obtain a TAC of a device. The processor can determine that the device has unknown technological capability by determining that the TAC does not indicate a known device make and known device model.

Based on the determined technological capability of the unknown devices and technological capability of the known devices, and the number of devices having various technological capability, the processor can predict bandwidth requirements associated with the telecommunication network. Further, the processor can predict how technological upgrades of the telecommunication network affect various devices and can determine whether the upgrades should be made; if they should be made, it can determine how the upgrades will affect various devices. In addition, the processor can notify the devices of the upcoming change in the telecommunication network.

Figure 4:
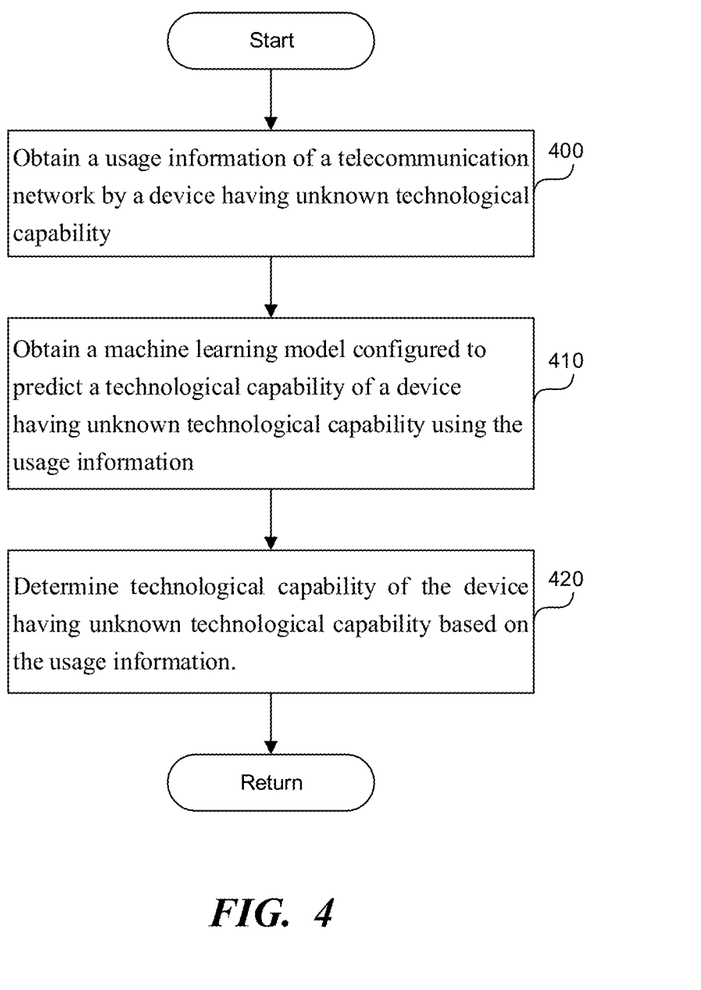
FIG. 4 is a flowchart of a method to determine technological capability of multiple devices having unknown technological capability, according to another embodiment.

FIG. 4 is a flowchart of a method to determine technological capability of multiple devices having unknown technological capability, according to another embodiment. In step 400, a processor can obtain a usage information by a device having unknown technological capability, where the usage information represents usage of a telecommunication network by the device having unknown technological capability, as described in this application.

In step 410, the processor can obtain a machine learning model configured to predict a technological capability of a device having unknown technological capability using the usage information.

In step 420, the processor can determine, using the machine learning model, technological capability of the device having unknown technological capability based on the usage information.

The processor can train a machine learning model by obtaining first usage information associated with the telecommunication network over a predetermined time period, such as a week, a month, several months, a year. The first usage information can include a TAC associated with a device having known technological capability and a pattern of use of the telecommunication network by other devices having same TAC. The first usage information can include which air interface protocols are supported by devices having known technological capability, whether voice over LTE is supported by certain devices, and which LTE bands are supported by certain devices.

The processor can train the machine learning model to predict technological capability of the device having unknown technological capability using the first usage information and the known technological capability by providing positive and negative feedback to the machine learning model, as explained in this application. Based on the usage information, the processor can create a two-stage machine model, wherein the first stage isolates a subset of parameters among the first usage information, and wherein the second stage represents a decision tree including thresholds to determine the technological capability of the device having unknown technological capability.

In other words, the two-stage machine model includes a first machine learning sub-model and a second machine learning sub-model. The first machine learning sub-model is configured to receive multiple inputs and determine a subset of the multiple inputs indicative of the technological capability of the device. The second machine learning sub-model is configured to receive the subset of the multiple inputs indicative of the technological capability of the device, compare the subset of the multiple inputs to a threshold, and based on the comparison determine the technological capability of the device.

Computer

Figure 5:
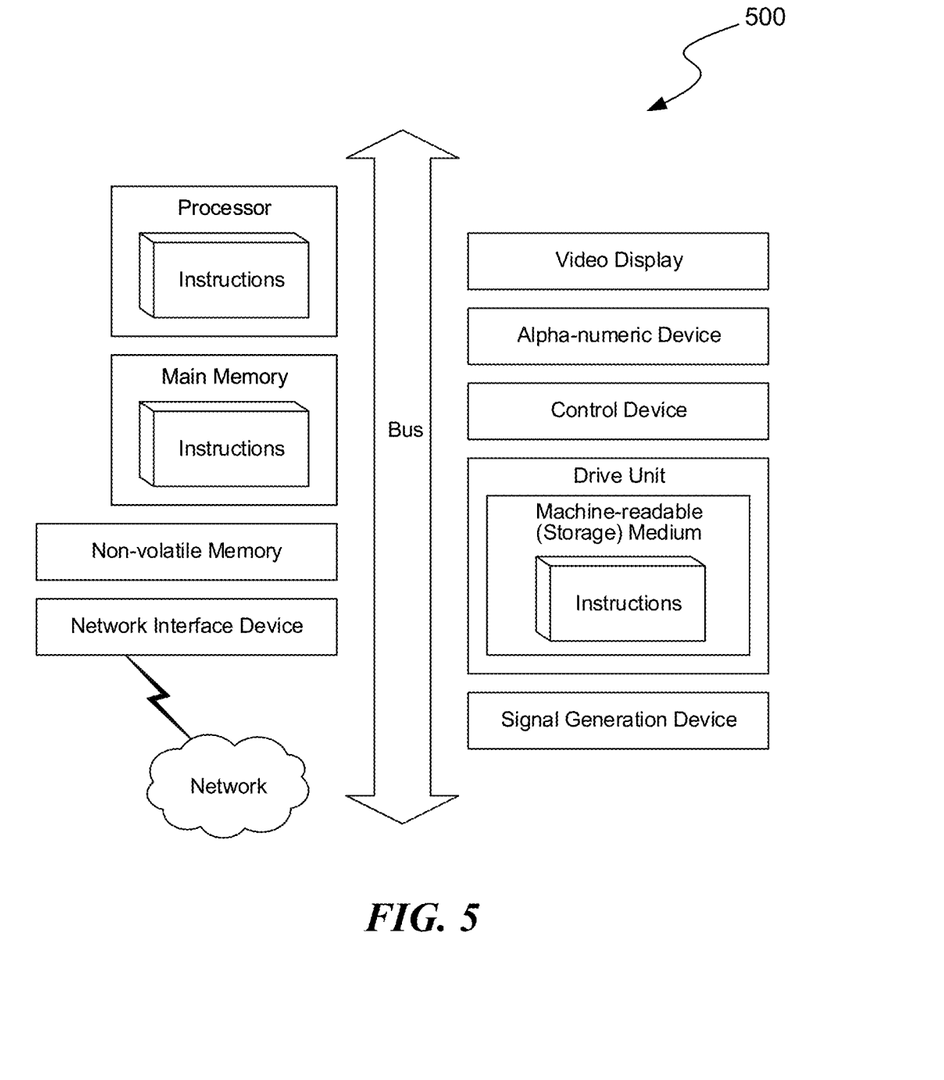
FIG. 5 is a diagrammatic representation of a machine in the example form of a computer system within which a set of instructions, for causing the machine to perform any one or more of the methodologies or modules discussed herein, can be executed.

FIG. 5 is a diagrammatic representation of a machine in the example form of a computer system 500 within which a set of instructions, for causing the machine to perform any one or more of the methodologies or modules discussed herein, can be executed.

In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the components described in the example of FIGS. 1-4 (and any other components described in this specification) can be implemented. The computer system 500 can be of any applicable known or convenient type. The components of the computer system 500 can be coupled together via a bus or through some other known or convenient device.

The computer system 500 can be associated with devices having a known technological capability 100, 110 in FIG. 1, or with the devices having unknown technological capability 120, 130 in FIG. 1. The processor of the computer system 500 can be used to train the machine learning model 200 in FIG. 2, as well as execute the machine learning model to determine the technological capability of a device. The processor of the computer system 500 can execute the steps of the methods shown in FIGS. 3-4.

This disclosure contemplates the computer system 500 taking any suitable physical form. As example and not by way of limitation, computer system 500 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 can include one or more computer systems 500; be unitary or distributed; span multiple locations; span multiple machines; or reside in a cloud, which can include one or more cloud components in one or more networks. Where appropriate, one or more computer systems 500 can perform without substantial spatial or temporal limitation one or more steps of one or more methods described or illustrated herein. As an example and not by way of limitation, one or more computer systems 500 can perform in real time or in batch mode one or more steps of one or more methods described or illustrated herein. One or more computer systems 500 can perform at different times or at different locations one or more steps of one or more methods described or illustrated herein, where appropriate.

The processor can be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disc, a read-only memory (ROM), such as a CD-ROM, EPROM, or EEPROM, a magnetic or optical card, or another form of storage for large amounts of data. Some of this data is often written, by a direct memory access process, into memory during execution of software in the computer 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory cannot even be possible. Nevertheless, it should be understood that for software to run, if necessary, it is moved to a computer-readable location appropriate for processing, and for illustrative purposes, that location is referred to as the memory in this application. Even when software is moved to the memory for execution, the processor will typically make use of hardware registers to store values associated with the software, and a local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 500. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Wash., and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical discs (e.g., Compact Disk Read-Only Memory (CD-ROMS), Digital Versatile Disks, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/ or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including U.S. Pat. No. 10,147,096, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

The invention claimed is:

1. At least one computer-readable medium, excluding transitory signals, and carrying instructions, which when executed by at least one data processor, determines technological capability of multiple mobile devices having unknown technological capabilities and which are associated with a wireless telecommunication network, the instructions comprising:
   obtaining first usage information associated with use of the wireless telecommunication network,
      wherein the first usage information represents usage of the telecommunication network by multiple mobile devices having known technological capabilities,
      wherein the multiple mobile devices are associated with users of the wireless telecommunications network, and
      wherein the known technological capabilities of the multiple mobile devices include at least two of:
         which air interface protocols are supported by mobile devices among the multiple mobile devices,
         whether voice over LTE is supported by certain mobile devices among the multiple mobile devices, or
         which LTE bands are supported by certain mobile devices among the multiple mobile devices;
   training a machine learning model to predict technological capabilities of mobile devices having unknown technological capabilities,
      wherein the machine learning model uses the first usage information and the known technological capabilities of the multiple mobile devices;
   obtaining second usage information associated with use of the wireless telecommunication network,
      wherein the second usage information represents usage of the wireless telecommunication network by a second set of multiple mobile devices having unknown technological capabilities, and
      wherein the obtaining includes obtaining type allocation codes (TAC) for at least some of the multiple mobile devices in the second set; and
   determining, using the trained machine learning model, technological capabilities of the multiple mobile devices having unknown technological capabilities based on the second usage information.

2. The computer-readable medium of claim 1, wherein the first and second usage information comprises at least four of: percent of data consumption associated with 2G air interface protocol, percent of data consumption associated with 3G air interface protocol, percent of data consumption associated with LTE air interface protocol, percent of mobile devices using 2G air interface protocol, percent of mobile devices using 3G air interface protocol, percent of mobile devices using the LTE air interface protocol, percent of calls using voice over LTE, percent of mobile devices using voice over LTE, percent of mobile devices using mid-band LTE, or percent of mobile devices using high-band LTE.

3. The computer-readable medium of claim 1, comprising:
   determining that the at least some of the multiple mobile devices in the second set have unknown technological capabilities by determining that the TAC does not indicate a known mobile device make and known mobile device model.

4. The computer-readable medium of claim 1, wherein training the machine learning model further comprises:
   receiving first usage information including multiple parameters;
   determining a subset of the multiple parameters to obtain key performance indicator (KPI) parameters; and
   creating a decision tree based on the KPI parameters,
      wherein a node in the decision tree includes a threshold used to determine technological capabilities of a mobile device, and
      wherein a leaf node in the decision tree indicates the technological capabilities of the mobile device.

5. The computer-readable medium of claim 1, wherein the machine learning model comprises a first sub-model and a second sub-model,
   wherein the second sub-model comprises a decision tree,
   wherein a node in the decision tree includes a threshold used to determine technological capabilities of a mobile device, and
   wherein determining the technological capabilities of the multiple mobile devices having unknown technological capabilities further comprises:
      obtaining usage information from a mobile device having unknown technological capabilities among the multiple mobile devices having unknown technological capabilities;
      determining, by the first sub-model, a subset of the usage information to obtain a KPI parameter;
      traversing the decision tree by comparing the KPI parameter to the threshold;
      upon reaching a leaf node of the decision tree, obtaining the technological capabilities of the mobile device having unknown technological capabilities.

6. The computer-readable medium of claim 1, comprising:
   determining whether a particular mobile device supports voice over LTE by:
      determining a particular TAC number of the particular device,
      obtaining usage information of multiple other mobile devices having the same TAC number as the particular TAC number, wherein the usage information includes percent of calls using voice over LTE or percent of devices using voice over LTE of all the multiple other devices having the same TAC number, and
      providing the usage information to the machine learning model.

7. A system comprising:
   one or more hardware processors; and at least one memory coupled to the one or more processors, wherein the memory includes instructions executable by the one or more processors to:
- receive a type allocation code (TAC) of a device;
- determine that the device has unknown technological capability by determining that the TAC does not indicate a known device make and known device model;
- receive usage information by the device having unknown technological capability,
  - wherein the usage information represents usage of a telecommunication network by the device having unknown technological capability;
- execute a machine learning model configured to predict a technological capability of the device having unknown technological capability using the usage information, wherein the instructions to execute the machine learning model comprise instructions to:
  - receive first usage information associated with the telecommunication network over a predetermined time period,
    - wherein the first usage information represents usage of the telecommunication network by multiple devices having known technological capability; and
  - train the machine learning model to predict the technological capability of the device having unknown technological capability using the first usage information and the known technological capability; and
- determine, using the trained machine learning model, the technological capability of the device having unknown technological capability based on the usage information.

8. The system of claim 7, wherein the first usage information includes at least four of:
- percent of data consumption associated with 2G air interface protocol,
- percent of data consumption associated with 3G air interface protocol,
- percent of data consumption associated with LTE air interface protocol,
- percent of data consumption associated with 5G air interface protocol,
- percent of mobile devices using 2G air interface protocol and having a same type allocation code (TAC) number,
- percent of mobile devices using 3G air interface protocol and having the same TAC number,
- percent of mobile devices using LTE air interface protocol and having the same TAC number,
- percent of mobile devices using 5G air interface protocol and having the same TAC number,
- percent of calls using voice over LTE,
- percent of mobile devices using voice over LTE and having the same TAC number,
- percent of mobile devices using mid-band LTE and having the same TAC number,
- percent of mobile devices using high-band LTE and having the same TAC number,
- percent of data consumption associated with LTE band 2,
- percent of data consumption associated with LTE band 4,
- percent of data consumption associated with LTE band 12,
- percent of mobile devices using LTE band 4 and having the same TAC number,
- percent of mobile devices using LTE band 2 and having the same TAC number, and/or
- percent of mobile devices using LTE band 12 and having the same TAC number.

9. The system of claim 7, the machine learning model comprising a first machine learning sub-model and a second machine learning sub-model,
- wherein the first machine learning sub-model is configured to receive multiple inputs, and determine a subset of the multiple inputs indicative of the technological capability of the device, and
- wherein the second machine learning sub-model is configured to receive the subset of the multiple inputs indicative of the technological capability of the device, compare the subset of the multiple inputs to a threshold, and based on the comparison determine the technological capability of the device.

10. The system of claim 7, wherein the usage information comprises at least four of: percent of data consumption associated with 2G air interface protocol, percent of data consumption associated with 3G air interface protocol, percent of data consumption associated with LTE air interface protocol, percent of data consumption associated with 5G air interface protocol, percent of devices using 2G air interface protocol, percent of devices using 3G air interface protocol, percent of devices using the LTE air interface protocol, percent of devices using 5G air interface protocol, percent of calls using voice over LTE, percent of devices using voice over LTE, percent of devices using mid-band LTE, percent of devices using high-band LTE, percent of data consumption associated with LTE band 2, percent of data consumption associated with LTE band 4, percent of data consumption associated with LTE band 12, percent of devices using LTE band 4, percent of devices using LTE band 2, or percent of devices using LTE band 12.

11. The system of claim 7, wherein the instructions further comprise the instructions to train the machine learning model including:
- receive first usage information including multiple parameters;
- determine a subset of the multiple parameters to receive key performance indicator (KPI) parameters; and
- create a decision tree based on the KPI parameters, wherein a node in the decision tree includes a threshold used to determine the technological capability of a device and wherein a leaf node in the decision tree indicates the technological capability of the device.

12. The system of claim 7, wherein the machine learning model comprises a first sub-model and a second sub-model,
- wherein the second sub-model comprises a decision tree,
- wherein a node in the decision tree includes a threshold used to determine the technological capability of a device, and
- wherein the instructions to determine the technological capability of the device having unknown technological capability further comprise instructions to:
  - receive the usage information from the device having unknown technological capability;
  - determine, by the first sub-model, a subset of the usage information to receive a KPI parameter;
  - traverse the decision tree by comparing the KPI parameter among the KPI parameters to the threshold;
  - upon reaching a leaf node of the decision tree, receive the technological capability associated with the device having unknown technological capability.

13. The system of claim 7, the instructions further comprising the instructions to:
- predict bandwidth requirements associated with the telecommunication network based on technological capability of multiple devices having known technological capability, a number of devices having known technological capability, the technological capability of multiple devices with previously unknown technological capability, and a number of devices with previously unknown technological capability.

14. At least one non-transient, computer-readable medium, carrying instructions that, when executed by at least one data processor, performs a method comprising:
receive usage information associated with a device having unknown technological capability;
access a machine learning model configured to predict a technological capability of the device having unknown technological capability using the usage information,
wherein the usage information represents usage of a telecommunication network by the device having unknown technological capability;
wherein the machine learning model comprises a first machine learning sub-model and a second machine learning sub-model,
wherein the first machine learning sub-model is configured to receive multiple inputs and determine a subset of the multiple inputs indicative of the technological capability of the device having unknown technological capability, and
wherein the second machine learning sub-model is configured to receive the subset of the multiple inputs indicative of the technological capability of the device having unknown technological capability, compare the subset of the multiple inputs to a threshold or value, and based on the comparison determine the technological capability of the device having unknown technological capability; and,
determine, using the machine learning model, at least one technological capability of the device having unknown technological capability based on the usage information.

15. The computer-readable medium of claim 14, comprising:
receiving first usage information associated with the telecommunication network over a predetermined time period,
wherein the first usage information represents usage of the telecommunication network by multiple devices having known technological capability; and
training the machine learning model to predict technological capability of devices having unknown technological capability using the first usage information and the known technological capability.

16. The computer-readable medium of claim 14, comprising:
receiving first usage information by multiple devices having known technological capability using the telecommunication network over a predetermined time period,
wherein the first usage information includes a TAC associated with a device having known technological capability and a pattern of use of the telecommunication network by other devices having a same TAC; and
based on the usage information, creating a two-stage machine learning model including a first stage and a second stage, wherein the first stage isolates a subset of parameters among the first usage information, and wherein the second stage represents a decision tree including thresholds to determine the technological capability of the device having unknown technological capability.

17. The computer-readable medium of claim 14, comprising:
receiving first usage information associated with the telecommunication network over a predetermined time period,
wherein the first usage information represents usage of the telecommunication network by multiple devices having known technological capability including which air interface protocols are supported by devices among the multiple devices, whether voice over LTE is supported by certain devices among the multiple devices, and which LTE bands are supported by certain devices among the multiple devices; and
training the machine learning model to predict technological capability of devices having known technological capability using the first usage information and the known technological capability.

18. The computer-readable medium of claim 14, comprising:
receiving a type allocation code (TAC) of a device; and
determining that the device has unknown technological capability by determining that the TAC does not indicate a known device make and known device model.

19. The computer-readable medium of claim 14, comprising:
predicting bandwidth requirements associated with the telecommunication network based on technological capability of multiple devices having known technological capability, a number of devices having known technological capability, the technological capability of multiple devices with previously unknown technological capability, and a number of devices with previously unknown technological capability.

* * * * *